United States Patent [19]

Marui et al.

[11] Patent Number: 5,444,765
[45] Date of Patent: Aug. 22, 1995

[54] RADIO TELEPHONE APPARATUS HAVING A SERVICE AREA CONFIRMATION

[75] Inventors: Kuniyoshi Marui, Saitama; Shinya Takahashi; Kiyoshi Hattori, both of Tokyo, all of Japan

[73] Assignee: Kabushiki Kaisha Toshiba, Kawasaki, Japan

[21] Appl. No.: 229,093

[22] Filed: Apr. 18, 1994

Related U.S. Application Data

[63] Continuation of Ser. No. 855,781, Mar. 23, 1992, abandoned.

[51] Int. Cl.⁶ .................................... H04M 11/00
[52] U.S. Cl. ................................. 379/59; 379/58; 379/60; 455/33.1; 455/33.2
[58] Field of Search ................ 379/58, 59, 60, 63; 455/33.1, 33.2, 54.2

[56] References Cited

U.S. PATENT DOCUMENTS

| | | | |
|---|---|---|---|
| 4,233,473 | 11/1980 | Frost | 179/2 |
| 4,672,657 | 6/1987 | Dershowitz | 379/63 |
| 4,742,560 | 5/1988 | Arai | 455/33 |
| 4,761,806 | 8/1988 | Toki | 379/61 |
| 4,775,999 | 10/1988 | Williams | 379/59 |
| 4,811,377 | 3/1989 | Krolopp et al. | 379/62 |
| 4,831,647 | 5/1989 | D'Avello et al. | 379/91 |
| 4,833,701 | 5/1989 | Comroe | 379/60 |
| 4,853,951 | 8/1989 | Bauer | 379/63 X |
| 4,891,638 | 1/1990 | Davis | 340/825.44 |
| 4,901,340 | 2/1990 | Parker et al. | 379/60 |
| 4,905,301 | 2/1990 | Krolopp et al. | 455/34 |
| 4,916,728 | 4/1990 | Blair | 379/59 |
| 5,101,500 | 3/1992 | Marui | 455/33 |

OTHER PUBLICATIONS

The Bell System Technical Journal, Advanced Mobile Phone Service, vol. 58, No. 1, Jan. 1979, pp. 124–126.

*Primary Examiner*—Curtis Kuntz
*Assistant Examiner*—G. J. Oehling
*Attorney, Agent, or Firm*—Banner & Allegretti, Ltd.

[57] ABSTRACT

A radio telecommunication apparatus includes a storage for storing a system identification data of a system to which the apparatus belongs to and provides an indication relating to where the apparatus is present on the basis of a result of a comparison between the system identification data stored in the storage and a system identification data received through a control channel which is established immediately before a speech communication link is established. According to the present invention, even if the user's apparatus moves, at the time of calling, from the home area to the roam area or from the roam area to the home area, the area confirmation data corresponding to the current position of the apparatus is accurately displayed.

25 Claims, 8 Drawing Sheets

RADIO TELEPHONE APPARATUS HAVING A SERVICE AREA CONFIRMATION

This application is a continuation of application Ser. No. 07/855,781, filed Mar. 23, 1992, now abandoned.

FIELD OF THE INVENTION

The present invention relates to a radio telecommunication apparatus used in a radio telecommunication system such as a cellular radio system and, more specifically, to a radio telecommunication apparatus having a function of displaying whether the apparatus is present within its own service area.

BACKGROUND OF THE INVENTION

In prior art cellular radio telephone systems, a geographical area is covered and served by breaking the area into a plurality of small zones or cells. A large land area can be covered by a plurality of connected cell areas. A mobile telephone switching office (MTSO) is provided for each area and is connected to a plurality of base stations, each covering a cell within the area.

FIG. 1 is a diagram illustrating a conventional cellular radio telephone system. Referring to FIG. 1, the user of cellular radio telephone 101 usually travels within an area 102 and is assigned an identification (ID) number for the user's cellular radio telephone which is registered in a corresponding MTSO 103 which covers the area. The area is called a home area and the user is called a home area user. If the user travels out of area 102 and enters another area, the new area is called a roam area and the user is called a roamer in the new area. User fees for calls from the cellular radio telephone via the MTSO covering the roam area are higher than for calls via the MTSO covering the home area. It should be noted that, when a call is made from a cellular radio telephone, the ID number for the cellular radio telephone is transmitted to the MTSO covering the area where the cellular radio telephone is located and the MTSO can therefore distinguish roamers and home area users by checking whether the transmitted ID number is registered in the MTSO.

Similarly, the radio telephone may check within which of the home area or roam area the telephone is located on the basis of system identification (SID) information transmitted from the MTSO, and provides a display as to whether the user is presently a home area user or roamer. The display is very useful to the user because the user may know in advance whether the user fee would be higher owing to the roamer usage.

It is thus proposed to provide the radio telephone with a service area confirmation display function.

An example of the operation of the conventional radio telephone having the service area confirmation display function will now be described. When the apparatus is turned on, the operational state of the circuits in the apparatus are initialized. Then, a control channel (a paging channel, hereinafter called "P-channel") for receiving control signals, such as an incoming call signal, is selected. The P-channel is selected out of the plurality of P-channels, which are dedicated by the MTSO, by measuring the received signal strength thereof and finding the P-channel having the strongest received signal strength. Once the selection of P-channel is completed, the P-channel is set in the receiver and word synchronization is acquired. Thereafter, the reception standby state is maintained. In the reception standby state, the P-channel is reestablished at intervals of five minutes.

System information is detected out of the control signals transmitted through the P-channel, and system identification data through the P-channel (SIDp) included in the system information is stored in the apparatus. The SIDp is compared with a home system identification data (SIDH). The SIDH is a system identification of the system to which the user's apparatus belongs. The SIDH is prestored in an identification data memory (ID-ROM). When both identification data SIDp and SIDH coincide, it is determined that the apparatus is present within the home area. On the other hand, if both identification data SIDp an SIDH do not coincide, it is determined that the apparatus is present in a service area another than the home area, i.e., a roam area system, and an LCD display device displays, e.g., "ROAM", indicating that the apparatus is outside the home area. Accordingly, the user may confirm whether the user's apparatus is located within the home area.

The conventional cellular radio telephone apparatus, however, has the following problem to be solved. In the conventional apparatus, whether the user's apparatus is present within the home area is determined on the basis of the system identification data transmitted from the base station over the P-channel established in the reception standby state. Thereafter, the area display corresponding to the determination result is retained until the SIDp is updated by reestablishment of the P-channel. Consequently, even if the user's apparatus, which may be installed in a car, moves from the home area to a roam area in a short time, the area display made prior to the movement of the user is unchanged. That is, the area display indicates that the user's apparatus is present within the home area. Although the user's apparatus has been actually moved to the roam area, the user's apparatus wrongly indicates to the user that the user is a home area user and a call may be placed in this situation. This results in an undesirable situation wherein high charge is incurred unknowingly to the user.

SUMMARY OF THE INVENTION

It is accordingly an object of the present invention to provide an improved radio telecommunication apparatus wherein the user may accurately confirm whether the user's apparatus is located within the home area, at the exact time of making a call, whereby the user may originate a call after identifying the system actually serving the apparatus.

In order to achieve the above object, according to the present invention, in a radio telecommunication system wherein one or more base units broadcast radio signals including a system identification data identifying the system over one of a plurality of control channels, the radio telecommunication apparatus includes a storage for storing a system identification data of a system to which the apparatus belongs to, and provides an indication to a user of the apparatus by the steps of: establishing a control channel in response to the user's request of call placement, receiving a system identification data through the control channel, comparing the system identification data received through the control channel with the system identification data stored in the apparatus, and providing an indication relating to a location where the apparatus is present to the user on the basis of a result of the above comparing step.

According to the present invention, at the time of call placement, an indication representative of the position of the user's apparatus is provided to a user of the apparatus on the basis of the system identification data obtained through a control channel which is established prior to establishing a speech communication link. Even if the user's apparatus moves, at the time of calling, from the home area to the roam area or from the roam area to the home area, the area confirmation data corresponding to the current position of the apparatus is accurately displayed.

Accordingly, on the basis of the updated display data, the user may exactly judge whether his/her apparatus is present within the home area. This substantially overcomes the following disadvantages of the conventional radio telephone: it is erroneously determined that the user's apparatus is present within the home area, although it is, in fact, present within the roam area, resulting in a higher speech charge. It is also possible to prevent the following undesirable situation: the user gives up calling because he/she identifies himself/herself as a roamer, although his/her apparatus is actually present within the home area.

DETAILED DESCRIPTION OF THE PREFERRED EMBODIMENTS

An embodiment of the present invention will now be described.

Figure 1:
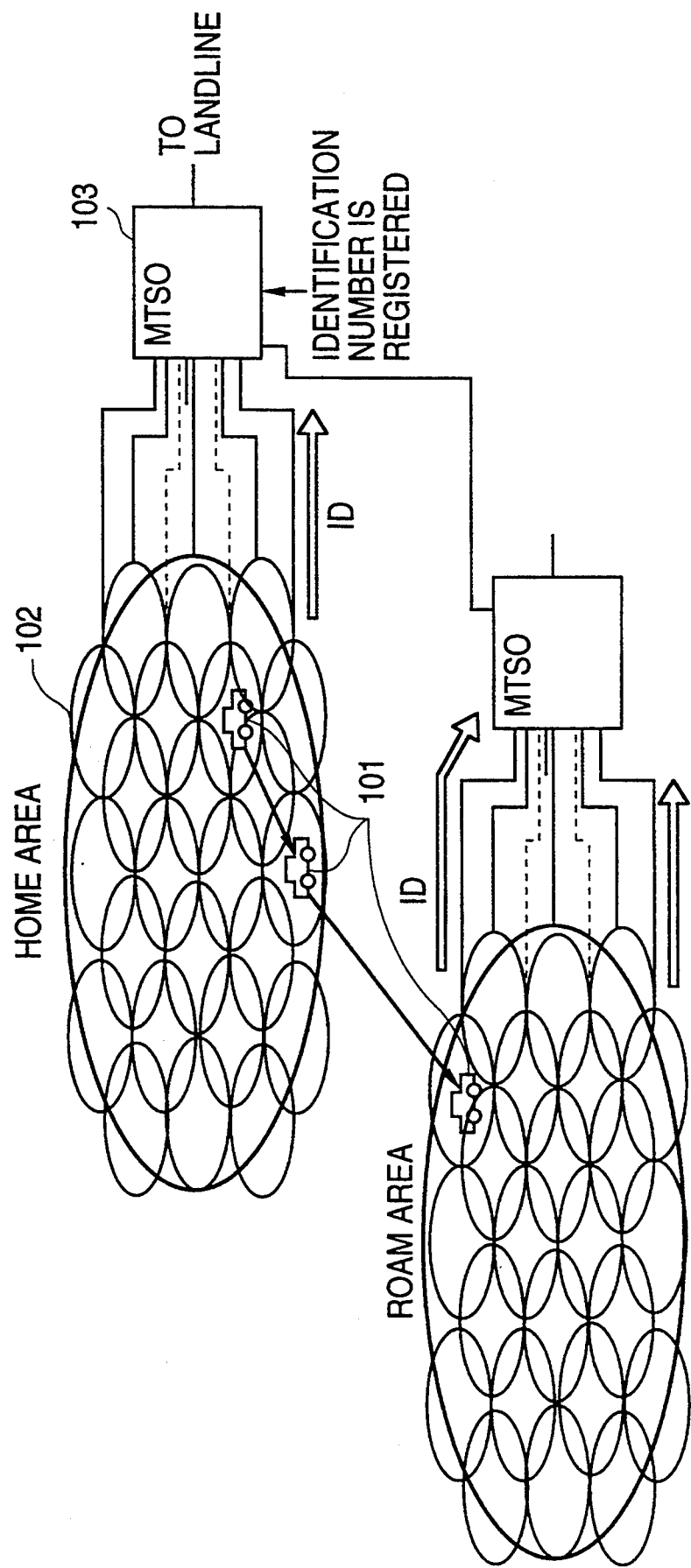
FIG. 1 is a block diagram illustrating a conventional cellular radio system.
Figure 2:
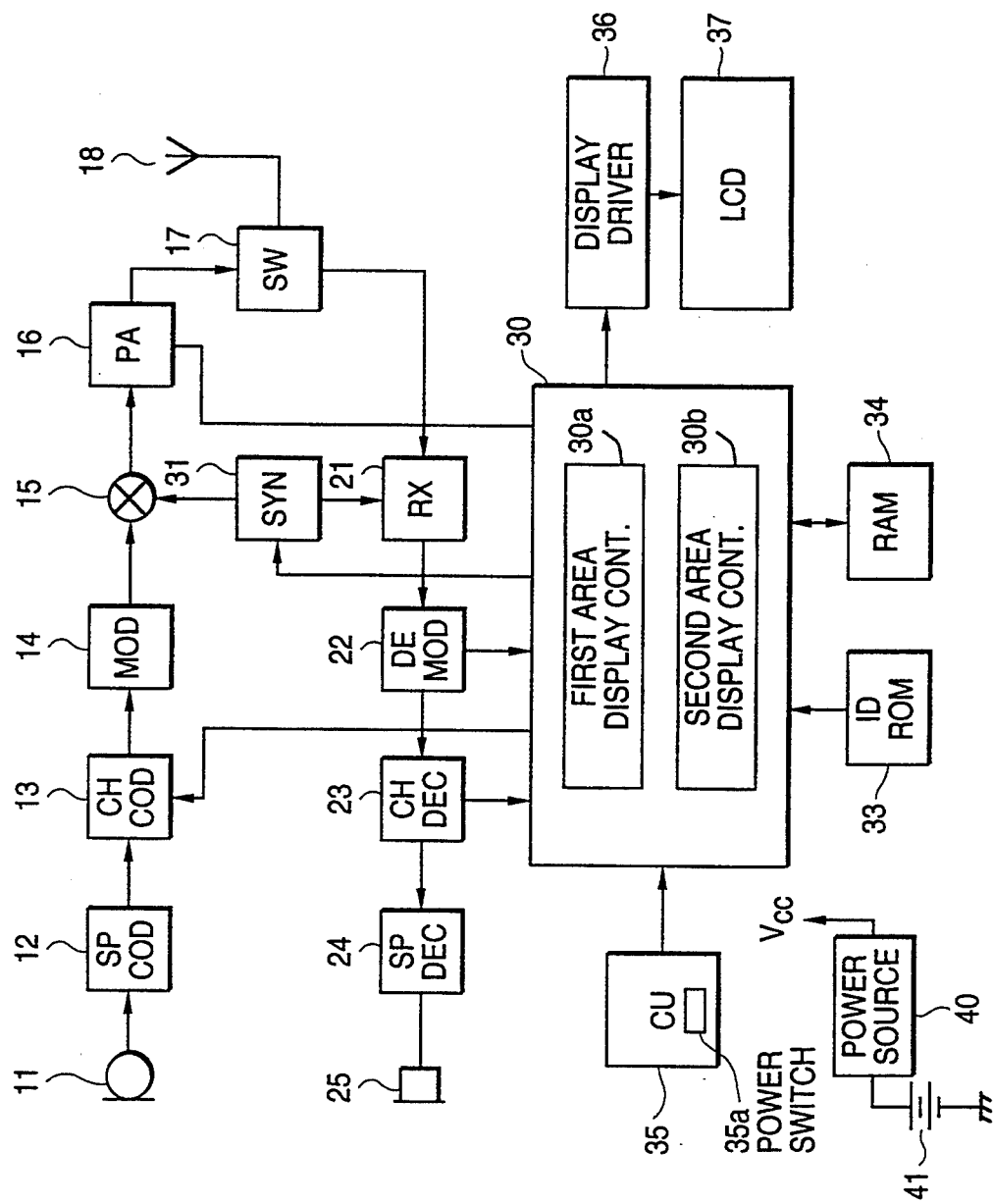
FIG. 2 is a circuit block diagram of a radio telephone according to an embodiment of the present invention.
Figure 3:
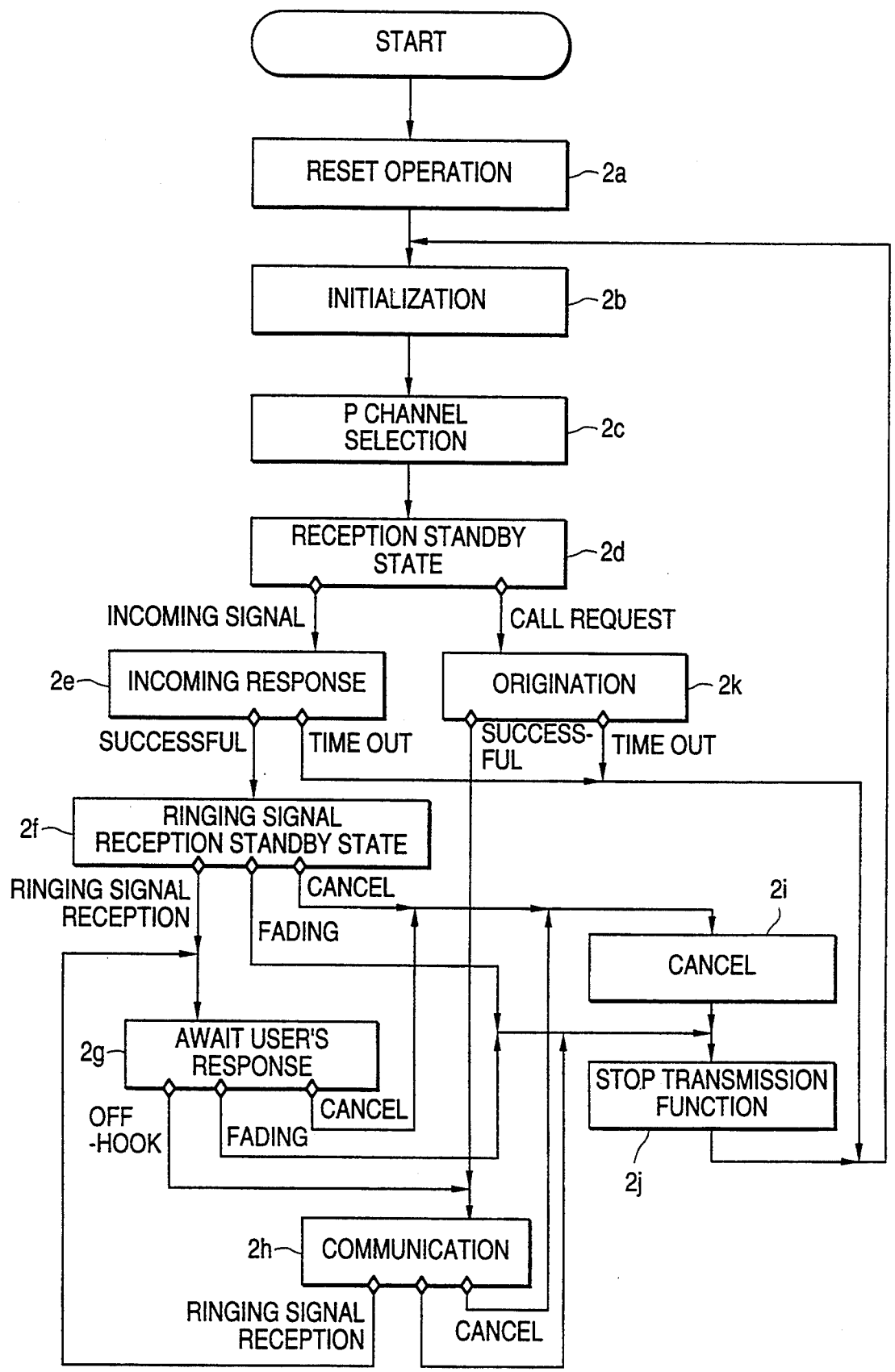
FIG. 3 is a flowchart illustrating the main routine operations of the control circuit of the apparatus shown in FIG. 2.

FIG. 2 is a circuit block diagram showing a radio telephone according to an embodiment of the present invention. This radio telephone generally comprises transmission circuitry, reception circuitry and control circuitry. Reference numeral 40 denotes a power source circuit which generates an operation voltage Vcc necessary for the apparatus, on the basis of the output from a battery 41.

The transmission circuitry comprises a microphone 11 functioning as a telephone transmitter, a speech encoder (SPCOD) 12, an error-correction encoder (CHCOD) 13, a digital modulator (MOD) 14, a multiplier 15, a power amplifier (PA) 16, a radio-frequency switching circuit (SW) 17, and an antenna 18. The speech encoder 12 encodes a speech transmission signal output from the microphone 11. The error-correction encoder 13 performs error-correction encoding of a digitized speech transmission signal output from the speech encoder 12 and a digitized control signal output from a control circuit 30 (described later). The digital modulator 14 generates a modulated signal corresponding to the digitized transmission signal output from the error-correction encoder 13. The multiplier 15 mixes the modulated signal with a local oscillation signal output from a frequency synthesizer 31. The mixed signals are frequency-converted to a radio frequency signal. The power amplifier 16 amplifies the radio transmission signal output from the multiplier 15 up to a predetermined transmission power level. The radio-frequency switch 17 is rendered operative only for a time period of a transmission time slot designated by the control circuit 30. During this time period, the radio transmission signal output from the power amplifier 16 is supplied to the antenna 18 and transmitted to a base station (not shown).

On the other hand, the reception circuitry comprises a receiver (RX) 21, a digital demodulator (DEMOD) 22, an error-correction decoder (CHDEC) 23, a speech decoder (SPDEC) 24, and a loudspeaker 25 functional as a telephone receiver. The receiver 21 performs a mixing function. That is, the receiver 21 frequency-converts a received radio-frequency signal, which was received by the antenna 18 and radio frequency switch 17, directly to an intermediate frequency signal or a base band signal. The digital demodulator 22 establishes bit-synchronization and frame-synchronism (i.e., word synchronization) for the received digital signal output from the receiver 21, and performs digital demodulation. A sync. signal obtained by the word synchronization is supplied to the control circuit 30. The error-correction decoder 23 performs error-correction decoding of the digital demodulated signal output from the digital demodulator 22. A signal obtained by the error-correction decoding consists of a digital speech reception signal and digital control information. The digital speech reception signal is input to the speech decoder 24, and the digital control information is delivered to the control circuit 30 for various control operations relating to the establishment of control and speech channels, etc. The speech decoder 24 performs decoding of the digital speech signal. An analog speech reception signal reproduced by the decoding operation is output to the loudspeaker 25.

The control circuitry comprises a controller (CONT) 30, a frequency synthesizer (SYN) 31, a system identification information memory (ID-ROM) 33, a control data memory (RAM) 34, a console unit (CU) 35, a display driver circuit 36, and a liquid crystal display (LCD) 37. The frequency synthesizer 31 generates local oscillation signals corresponding to channel frequencies for control and speech channels designated by the control circuit 30. The ID-ROM 33 prestores system identification data SIDH of the system to which the user's apparatus belongs. The SIDH was entered into the ID-ROM by telephone dealers when the user purchases the telephone. The RAM 34 stores control data such as a telephone number input by dial keys or system identification data transmitted from the base station over various control channels. The console unit 35 is provided with a key pad having dial keys, a call request key, etc. The LCD display 37 is driven by the display driver circuit 36 to display a dial number and information indicating whether or not the user's apparatus is located within the home area, i.e. the surface area of the system to which the apparatus belongs.

The control circuit 30 comprises, for example, a microcomputer as a main control unit. The control circuit 30 includes first area-display control means 30a and second area-display control means 30b, in addition to ordinary control functions relating to the initialization of the apparatus, call-reception, call-transmission, and speech communication link establishment.

The first area-display control means 30a detects system identification data SIDp transmitted from the base station over a P-channel set in the standby state, and causes the SIDp to be stored in the RAM 34. The first area-display control means 30a compares the detected system identification data SIDp with the system identification data SIDH which is prestored in the ID-ROM 33 and relates to the system to which the user's apparatus belongs. If the data SIDp and the data SIDH do not coincide, it is determined that the user's apparatus is present within the roam area, and the LCD display 37 displays, e.g., "ROAM". When data SIDp and SIDH coincide, it is determined that the user's apparatus is present within the home area, and the LCD display 37 does not display "ROAM".

The second area-display control means 30b detects a system identification data SIDA transmitted from the base station over an access channel (A-channel), established prior to an establishment of speech communication link, and compares the detected system identification data SIDA with the system identification data SIDH. If the SIDA and the SIDH do not coincide, it is determined that the user's apparatus is present within the roam area, the LCD display 37 displays, e.g., "ROAM". If the SIDA and SIDH coincide, it is determined that the user's apparatus is present within the home area, and the displayed indication of "ROAM" on the LCD display 37 is erased.

The operation of the apparatus having the above arrangement will now be described in accordance with the control procedure of the control circuit 30. FIG. is a flowchart illustrating the main routine of the control procedure.

Figure 4:
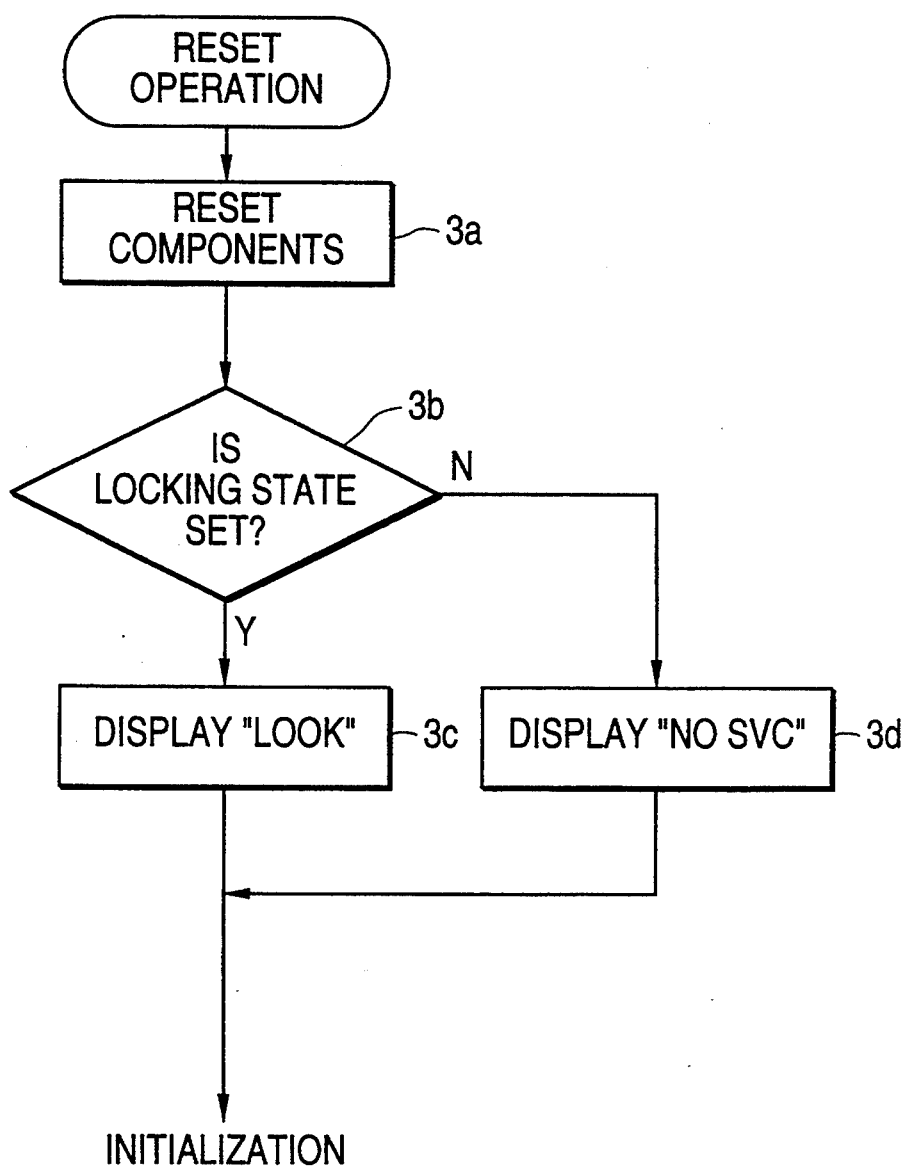
FIG. 4 is a flowchart illustrating the reset operation in the flowchart of FIG. 3.

When the power switch 35a is turned on, the control circuit 30 executes a reset operation in step 2a. Specifically, as shown in FIG. 4, the states of the respective parts of the circuits are reset in step 3a. In subsequent step 3b, the lock state is monitored. The lock state is set to prevent false use of the apparatus by a third party. When the lock state setting operation is performed, the apparatus is maintained in the lock state. Unless and until a specific key is operated, the apparatus cannot be used. While the lock state is set, the LCD display 37 displays "LOCK" (step 3c). On the other hand, if the lock state is not set, the LCD displays 37 displays "NO SVC" in step 3d.

Figure 5:
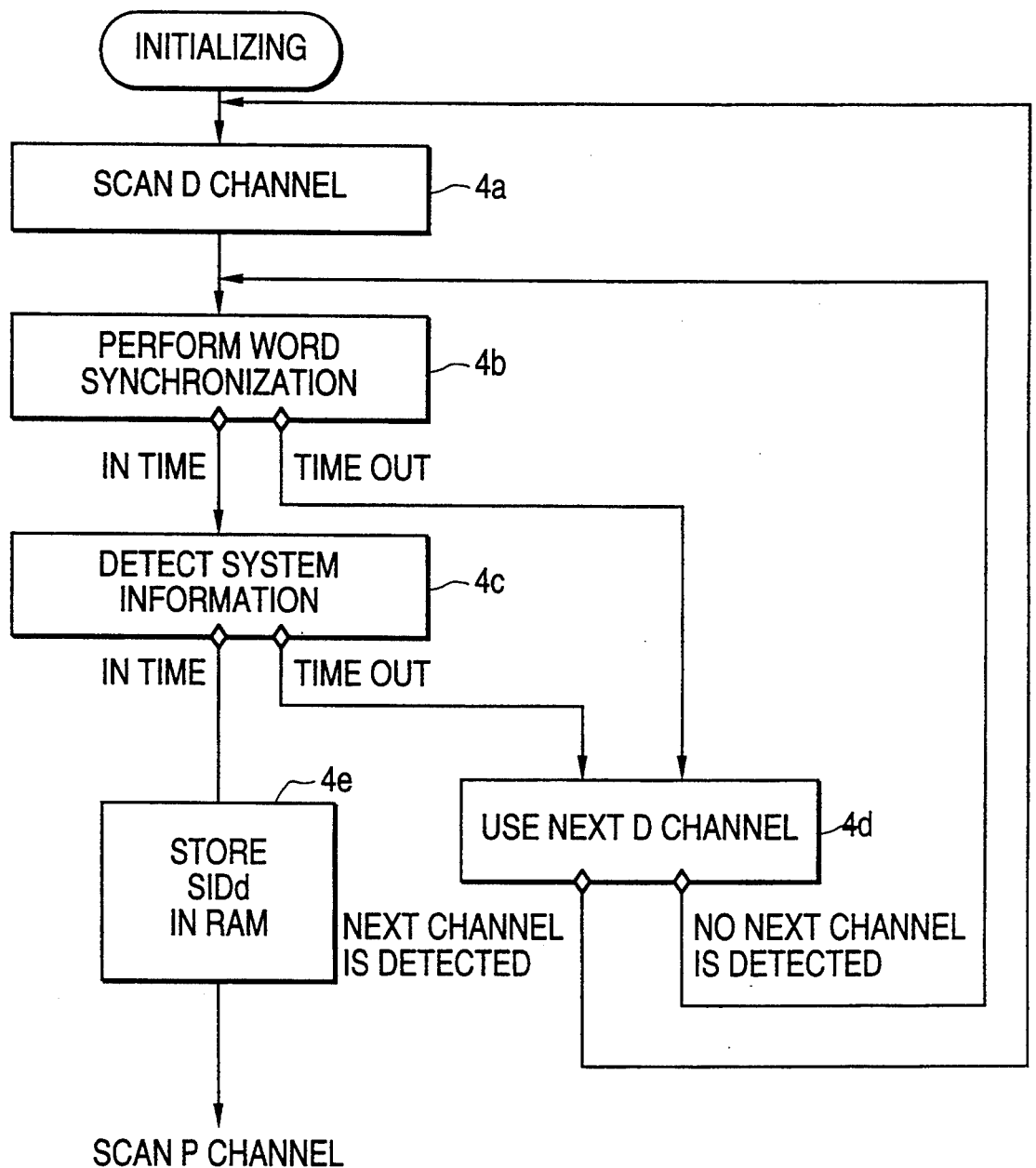
FIG. 5 is a flowchart illustrating the initialization operation in the flowchart of FIG. 3.

When the reset is completed, the control circuit 30 executes an initializing operation in step 2b. As is shown in FIG. 5, in step 4a, a plurality of control channels (Dedicated Control Channels, hereinafter called D-channels) for initialization are scanned, thereby selecting a channel having a strongest received signal strength, and a channel having a second strongest received signal strength. In step 4b, a control operation is performed to establish bit synchronization and frame synchronization (i.e., word synchronization) for the D-channel having the strongest received signal strength. When the word synchronization is acquired in a predetermined time period by this control operation, the control routine goes to step 4c. In step 4c, system identification data SIDd is detected from control information transmitted from the base station over the D-channel. In step 4e, the SIDd is stored in the RAM 34. If the word synchronization is not acquired in the predetermined time period or the system identification data is not detected in steps 4b and 4c, the control routine goes to step 4d. In step 4d, the D-channel having the second strongest received signal strength is selected, and the control of steps 4b to 4e is executed for this D-channel.

Figure 6:
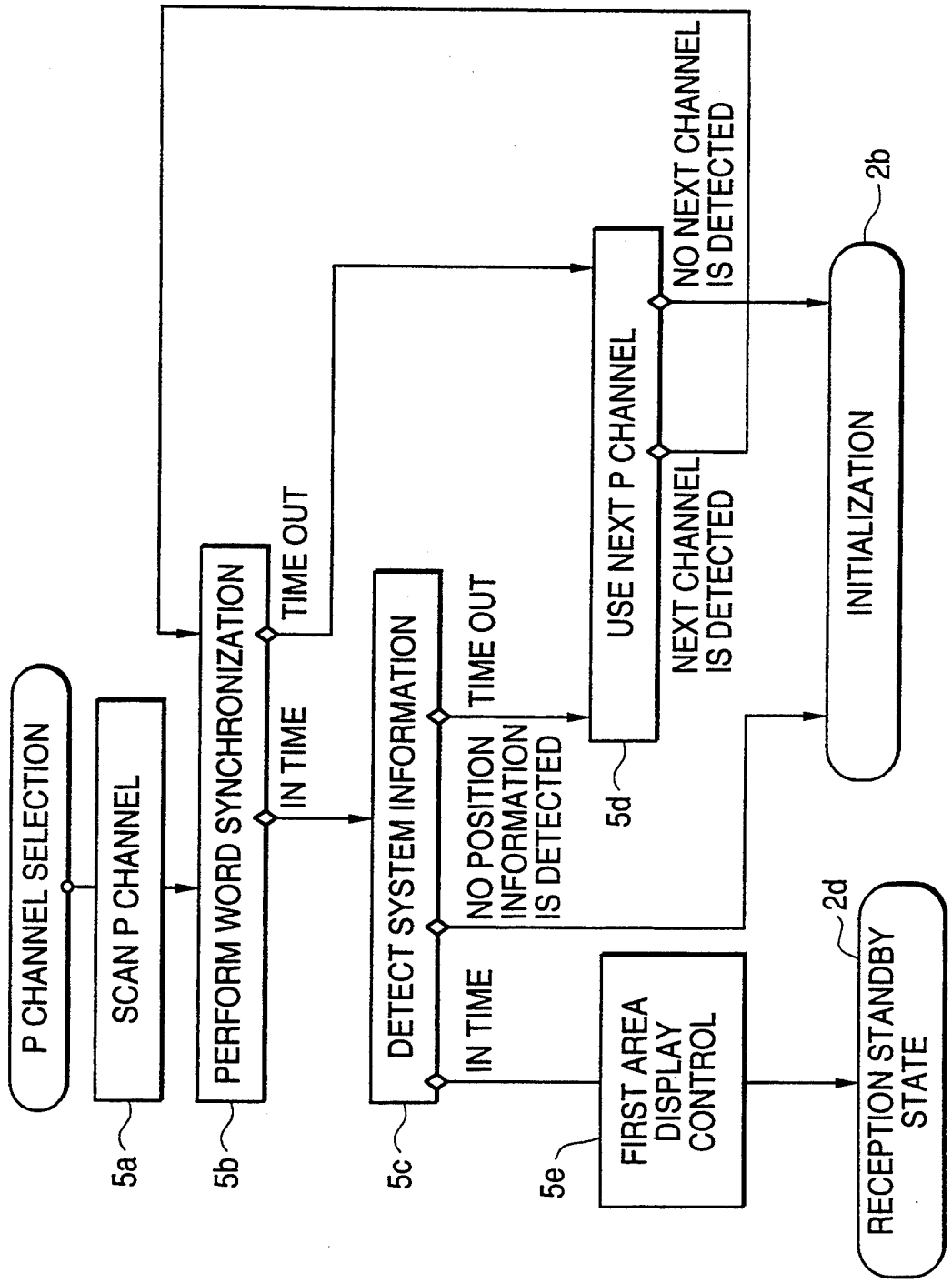
FIG. 6 is a flowchart illustrating the P-channel selecting operation in the flowchart of FIG. 3.

When the initializing step is completed, the control circuit 30 executes the control of step 2c, and executes the P-channel selection control for the standby state. Specifically, as shown in FIG. 6, in step 5a, a plurality of P-channels are scanned, thereby selecting a channel having a strongest received signal strength, and a channel having a second strongest received signal strength. In step 5b, a control operation is performed to acquire bit synchronization and frame synchronization (i.e., word synchronization) for the P-channel having the strongest received signal strength. When the word synchronization is acquired in a predetermined time period, the control routine goes to step 5c. In step 5c, a system identification data SIDp (a system identification data transmitted over the selected paging channel) is detected from control information transmitted from the base station over the P-channel, and the SIDp is stored in the RAM 34. If the word synchronization is not acquired in the predetermined time period or the system identification data is not detected in a predetermined time period in steps 5b and 5c, the control routine goes to step 5d. In step 5d, the P-channel having the second strongest received signal strength is selected, and the word synchronization is acquired and a system identification data is detected for the P-channel. If the system identification data SIDp detected from the P-channel does not coincide with the system identification data SIDd detected from the D-channel at the time of initialization, the control routine returns to the initializing control (step 2b).

Figure 7:
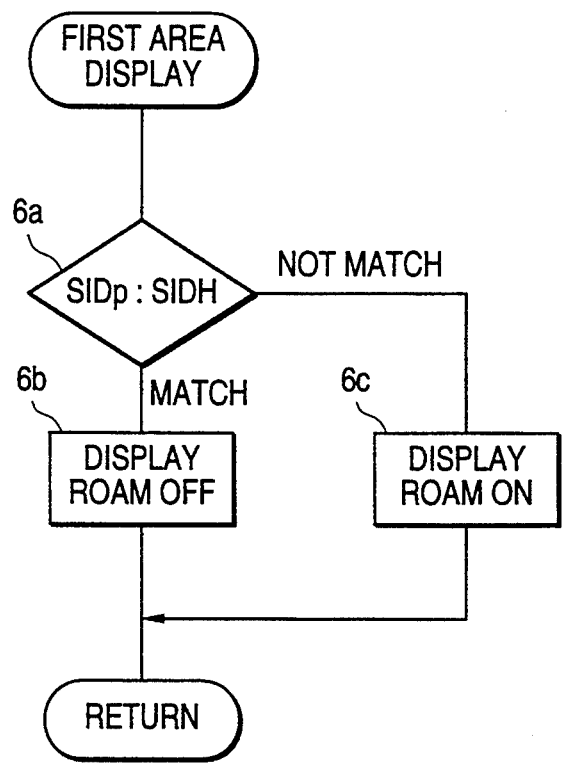
FIG. 7 is a flowchart illustrating the first area-display control in the flowchart of FIG. 6.

If the system identification data SIDp is detected in step 5c, the control of the control circuit 30 goes to step 5e, and the first area-display control is executed in the following manner. FIG. 7 shows the control steps thereof. Specifically, in step 6a, the control circuit 30 compares the system identification data SIDp detected through the P-channel with the system identification data SIDH which is prestored in the ID-ROM 33 and relates to the system to which the user's apparatus belongs. If the SIDp and SIDH coincide, it is determined that the user's apparatus is present within the home area, and "ROAM" is not displayed. On the other hand, if the SIDp and SIDH do not coincide, it is determined that the user's apparatus is present within the roam area, and the LCD display 37 displays "ROAM" in the step 6c. Accordingly, the user may confirm whether his/her apparatus is present within the home area or the roam area, on the basis of the presence/absence of indication of "ROAM". After the area identification display is performed, the control circuit 30 is set in the standby state (step 2d).

Now suppose that in the standby state an incoming call signal has come from the base station over the P-channel. In this case, the control routine of the control circuit 30 goes to step 2e, and the call-reception response control is executed. Specifically, the control circuit 30 first scans a plurality of access channels (A-channels) used to establish an access channel prior to establishing a speech communication link, and selects a channel having a strongest received signal strength and a channel having a second strongest received signal strength. Word synchronization for the selected A-channel is acquired and thereafter a call-reception response signal is transmitted to the base station over this A-channel. After the call-reception response signal is transmitted, the incoming of a speech channel designation signal from the base station is awaited. When the speech channel designation signal is received, the speech channel (SP-channel) designated by the speech channel designation signal is established. Thus, the apparatus is set in the ringing signal reception standby state (step 2f). If a ringing signal is received in this state, a lingering sound is generated, for example, from a sounder (not shown). Then, the control circuit 30 is set in the user's response awaiting state (step 2g). The user, who has recognized an occurrence of the call-reception from the lingering sound, responds by making an off-hook operation. Thus, the control circuit 30 executes the talk control in step 2h.

When a speech-finishing operation is performed in steps 2f and 2g, the control circuit 30 releases the reception state over the speech channel in step 2i, and stops the operation of the transmission circuitry in step 2j. Thereafter, the initializing operation is performed once again. In the states of steps 2f, 2g and 2h, if the received signal intensity remains lower than a predetermined level for a predetermined time period or more owing to the influence of phasing, etc., the control routine of the control circuit 30 goes on to step 2j and the control circuit 30 stops the operation of the transmission operation and performs the initializing operation once again.

Figure 8:
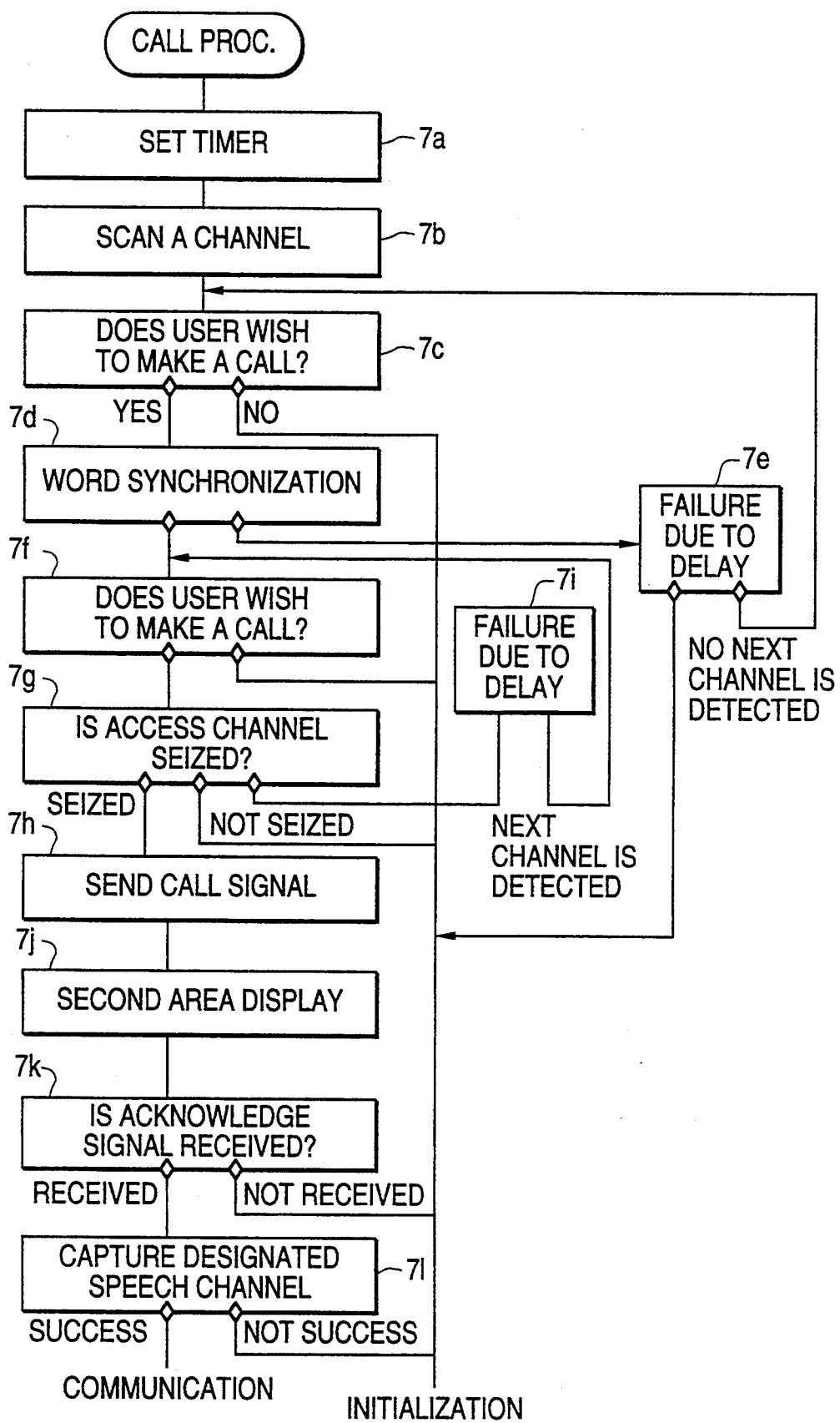
FIG. 8 is a flowchart illustrating the call placement control in the flowchart of FIG. 3.

Suppose that in the standby state (step 2d) a call request is made by operating a call request key or a speech dial. Then, the control circuit 30, in step 2k, executes the call request control. FIG. 8 is a flowchart showing the control procedures and the control items thereof.

In response to the user's operation on console unit 35 of entering a telephone number and depressing a send-key, the control circuit 30 starts a timer for counting a call request reception time (step 7a). This operation causes a call flag in control circuit 30 to change from '0' to '1'. The call request reception time is set at, fr example, 12 seconds. In step 7b, the control circuit 30 scans a plurality of A-channels, thereby selecting a channel with a strongest received signal strength and a channel with a second strongest received signal strength. In step 7c, it is confirmed whether the user wishes to make a call. If the user wishes to make a call, the control routine goes to step 7d, and a control is performed to establish word synchronization for the A-channel. Whether the user wishes to make a call is determined on the basis of the state of a call flag, i.e., "1" or "0". The call flag is changed to '0' when the user depresses an end-key on console unit 35. If it is determined that the user does not wish to make a call, the control routine returns to the initializing operation.

When word synchronization has been established in step 7d, the control circuit 30 confirms the user's wish to make a call once again in step 7f. Then, in control circuit 30, system-identification data SIDA is detected out of system information transmitted from the base station over the acquired access channel. Then, using the acquired access channel, a call origination signal, which contains information corresponding to a destination telephone number input by the user, is transmitted out (step 7h). If the access channel cannot be acquired within a predetermined time period, "failure" is determined in step 7i and the control routine returns to step 7f.

Figure 9:
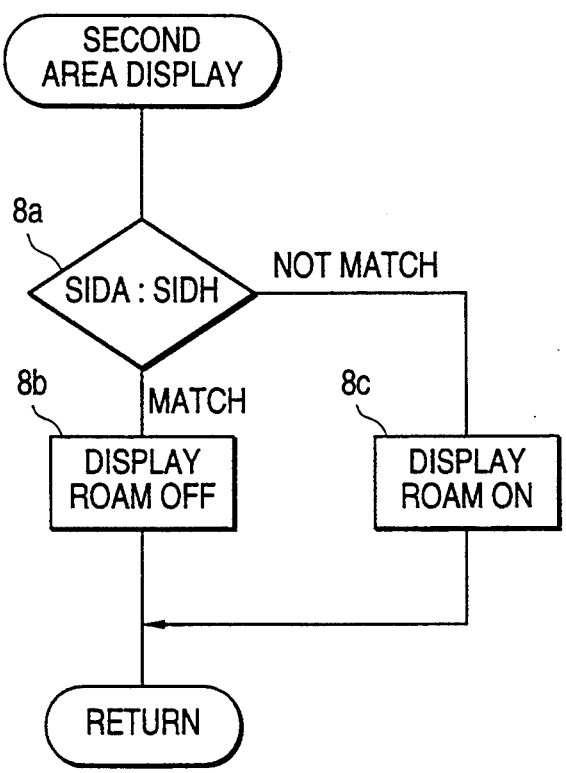
FIG. 9 is a flowchart illustrating the second area-display control in the flowchart of FIG. 8.

In the meantime, when the call signal has been transmitted, the control routine of the control circuit 30 goes to step 7j and the second area-display control is executed. Specifically, as shown in FIG. 9, in step 8a, the control circuit 30 compares the system identification data SIDA detected through the access channel with the system identification data SIDH which is prestored in the ID-ROM 33 and identifies the system to which the user's apparatus belongs. If the SIDA and SIDH do not coincide, "ROAM" is displayed on the LCD device 37 in step 8b. If the SIDA and SIDH coincide, the control routine advances to step 8c and "ROAM" on the LCD display 37 is erased.

When the area-display control is completed, the control circuit 30, in step 7k, monitors the sending-back of a call response signal. When the call response signal is transmitted back from the base station, the control routine advances to step 7l. In step 7l, a control is performed to capture the speech channel (SP-channel) designated by the call response signal. If the SP-channel is captured, the apparatus is set in the speech state (step 2h). If the sending-back of the call response signal is not detected in a predetermined time period or the capture of the SP-channel fails in steps 7k and 7l, the control routine goes back to the initializing operation.

In the present embodiment, in the call control procedure, the system identification data SIDA transmitted from the base station over the access channel is detected. The SIDA is compared with the system identification data SIDH which is prestored in the ID-ROM 33 and identifies the system to which the user's apparatus belongs. In accordance with the comparison result, the display of "ROAM" on the LCD display 37 is updated. Thus, even if the user's apparatus moves from one area to another in the standby state and the area data (ON/OFF of "ROAM") on the LCD display 37 does not represent the area in which the apparatus is actually situated, the area data displayed on the LCD display 37 is corrected to conform to the actual position of the apparatus at the time when the access channel has been established. Accordingly, the user may exactly confirm whether the user's apparatus is located in the home area or the roam area at the time of making a call, whereby the user may have a conversation with another party over a speech channel after exactly knowing whether the user is roamer. It is therefore possible to surely prevent the undesirable situation that a higher speech fee is charged unknowingly to the user.

The present invention is not limited to the above embodiment. For example, in the above embodiment, when the user's apparatus is present within the roam area, "ROAM" is displayed, and when it is present within the home area, "ROAM" is not displayed; however, it is possible to display "HOME" when the user's apparatus is present within the home area, and not to display "HOME" when it is present within the roam area. Alternatively, it is possible to display "ROAM" when the user's apparatus is within the roam area, and display "HOME" when it is within the home area. Furthermore, it is possible to change the display mode of "ROAM" to distinguish the roam area from the home area, for example, by flickering "ROAM", changing the color of "ROAM," or accompanying "ROAM" with an alarm.

Other various modifications can be made, within the spirit of the present invention, to the structure of the apparatus, the control procedures and control items of the control circuit, and the type, structure and display mode of the display means.

Although an embodiment applied to a cellular radio telephone has been described, it is apparent to those skilled in this art that the present invention may be easily applied to any kind of radio telecommunication apparatus. For example, the invention also is applicable to a cordless telephone system wherein a plurality of zones are covered by a plurality of base units and a mobile unit is capable of communicating with another apparatus over a plurality of control channels wherever the mobile unit moves around within the zones.

We claim:

1. A cellular radio telephone for use in a plurality of cellular radio systems, each having one or more base stations that broadcast radio signals throughout a service area over a paging channel and over an access channel, the radio signals including system identification data identifying the cellular radio system from which the radio signals are broadcast, said cellular radio telephone comprising:

storing means for storing system identification data of one of said cellular radio systems to establish said one cellular radio system as a home cellular radio system and to establish a service area throughout which said home cellular radio system broadcasts as a home service area;

establishing means for establishing a paging channel with a cellular radio system in whose service area said cellular radio telephone is then present in response to power-up of said cellular radio telephone and for establishing an access channel with a cellular radio system in whose service area said cellular radio telephone is then present in response to an input of call placement request by a user;

detecting means coupled to said establishing means for detecting system identification data from the radio signals broadcast over said established paging channel by said cellular radio telephone system in whose service area said cellular radio telephone is present at power-up of said cellular radio telephone and for detecting system identification data from the radio signals broadcast over said established access channel by said cellular radio telephone system in whose service area said cellular radio telephone is present at the input of the call placement request;

comparing means, coupled to said detecting means and said storing means, for comparing the system identification data detected from the radio signals broadcast over said established paging channel with the stored system identification data and for comparing the system identification data detected from the radio signals broadcast over said established access channel with the stored system identification data; and indication means, coupled to the comparing means, for providing an indication of roamer status if the system identification data detected from the radio signals broadcast over said established paging channel does not coincide with the stored system identification data and for providing an indication of roamer status if the system identification detected from the radio signals broadcast over said established access channel does not coincide with the stored system identification data.

2. The cellular radio telephone of claim 1, wherein said indication means eliminates the provided indication of roamer status if the system identification data subsequently detected from the radio signals broadcast over said established access channel coincides with the stored system identification data.

3. The cellular radio telephone of claim 1, wherein said indication means provides an indication of home area user status if the system identification data detected from the radio signals broadcast over said established paging channel coincides with the stored system identification data.

4. The cellular radio telephone of claim 3, wherein said indication means eliminates the provided indication of home area user status if the system identification data subsequently detected from the radio signals broadcast over said established access channel does not coincide with the stored system identification data.

5. The cellular radio telephone of claim 1, wherein said indication means provides an indication of home area user status if the system identification data detected from the radio signals broadcast over said established access channel coincides with the stored system identification data.

6. The cellular radio telephone of claim 1, further comprising a console unit having a call request key, and wherein said establishing means establishes the access channel with said cellular radio system in whose service area said cellular radio telephone is then present in response to actuation of said call request key by the user.

7. The cellular radio telephone of claim 1, wherein said storing means comprises a read-only memory.

8. A method of providing an indication to a user of a cellular radio telephone usable in a plurality of cellular radio systems, each said cellular radio system having one or more base stations that transmit radio signals throughout a service area over a paging channel and over an access channel, the radio signals including system identification data identifying the cellular radio system from which the radio signals are transmitted, wherein said cellular radio telephone stores system identification data of one of said cellular radio systems thereby establishing the service area throughout which said one cellular radio system transmits as a home service area of said cellular radio telephone, the method comprising the steps of:

establishing a paging channel with a cellular radio system in whose service area said cellular radio telephone is then present in response to initialization of said cellular radio telephone;

detecting system identification data from the radio signals transmitted over said established paging channel by said cellular radio system in whose service area said cellular radio telephone is present at initialization of said cellular radio telephone;

comparing the system identification data detected from the radio signals transmitted over said established paging channel with the stored system identification data;

providing an indication of roamer status of said cellular radio telephone if the system identification data detected from the radio signals transmitted over said established paging channel does not coincide with the stored system identification data;

establishing an access channel between said cellular radio telephone and a cellular radio system in whose service area said cellular radio telephone is then present in response to an input of a call placement request by a user;

detecting system identification data from the radio signals transmitted over said established access channel by said cellular radio system in whose service area said cellular radio telephone is present at the input of the call placement request;

comparing the system identification data detected from the radio signals transmitted over said established access channel with the stored system identification data;

providing said indication of roamer status of said cellular radio telephone if the system identification data detected from the radio signals transmitted over said established access channel does not coincide with the stored system identification data.

9. The method of claim 8, further comprising the step of: erasing said indication of roamer status if the system identification data subsequently detected from the radio signals transmitted over said established access channel coincides with the stored system identification data.

10. The method of claim 8, further comprising the step of: providing an indication of home area user status if the system identification data detected from the radio signals transmitted over said established paging channel coincides with the stored system identification data.

11. The method of claim 8, further comprising the step of: providing an indication of home area user status if the system identification data detected from the radio signals transmitted over said established access channel coincides with the stored system identification data.

12. The method of claim 8, wherein the system identification data of said one cellular radio system is stored in a read-only memory.

13. A radio telecommunication apparatus for use in a plurality of radio telecommunication systems, each having one more base units that broadcast radio signals over a plurality control channels throughout a service area, wherein the radio signals include system identification data identifying the radio telecommunication system from which the radio signals are broadcast, said radio telecommunication apparatus comprising:

storing means for storing system identification data of one of said plurality of radio telecommunication systems;

establishing means for establishing a first control channel with a radio telecommunication system in whose service area said radio telecommunication apparatus is then present in response to initialization of said radio telecommunication apparatus and for establishing a second control channel with a radio telecommunication system in whose service area said radio telecommunication apparatus is then present in response to an input of call placement request by a user;

detecting means coupled to said establishing means for detecting system identification data from the radio signals broadcast over said established first control channel by said radio telecommunication system in whose service area said radio telecommunication apparatus is present at initialization of said radio telecommunication apparatus and for detecting system identification data from the radio signals broadcast over said established second control channel from said radio telecommunication system in whose service area said radio telecommunication apparatus is present at the input of the call placement request;

comparing means, coupled to said detecting means and said storing means, for comparing the system identification data detected from the radio signals broadcast over said established first control channel with the stored system identification data and for comparing the system identification data detected from the radio signals broadcast over said established second control channel with the stored system identification data;

indication means coupled to the comparing means for providing an indication of roamer status if the system identification data detected from the radio signals broadcast over said established first control channel does not coincide with the stored system identification data and for providing the indication of roamer status if the system identification data detected from the radio signal broadcast over said established second control channel does not coincide with the stored system identification data.

14. The radio telecommunication apparatus of claim 13, wherein said indication means eliminates the indication of roamer status if the system identification data subsequently detected from the radio signals broadcast over said established second control channel coincides with the stored system identification data.

15. The radio telecommunication apparatus of claim 13, wherein said indication means provides an indication of home area user status if the system identification data detected from the radio signals broadcast over said established first control channel coincides with the stored system identification data.

16. The radio telecommunication apparatus of claim 13, wherein said indication means provides an indication of home area user status if the system identification data detected from the radio signals broadcast over said established second control channel coincides with the stored system identification data.

17. The radio telecommunication apparatus of claim 13, further comprising a console unit having a call request key, and wherein said establishing means establishes said second control channel with said radio telecommunication system in whose service area said radio telecommunication apparatus is present upon actuation of said call request key by a user.

18. The radio telecommunication apparatus of claim 13, wherein said storing means comprises a read-only memory.

19. A method of providing an indication to a user of a radio telecommunication apparatus used in a plurality of radio telecommunication systems, each said radio telecommunication system having one or more base units that broadcast radio signals over a plurality of control channels throughout a service area, the radio signals including system identification data identifying the radio telecommunication system from which the radio signals are broadcast, wherein said radio telecommunication apparatus stores identification data of one of said radio telecommunication systems thereby establishing the service area throughout which said one radio telecommunication system broadcasts as a home service area of the radio telecommunication apparatus, the method comprising the steps of:

establishing a first control channel between said radio telecommunication apparatus and a radio telecommunication system in whose service area said radio telecommunication apparatus is then present in response to initialization of said radio telecommunication apparatus;

receiving through said established first control channel system identification data from the radio signals broadcast by said radio telecommunication system in whose service area said radio telecommunication apparatus is present at initialization of said radio telecommunication apparatus;

comparing the system identification data received through said established first control channel with the stored system identification data;

providing an indication of roamer status if the system identification data received through said established first control channel does not coincide with the stored system identification data;

establishing a second control channel between said radio telecommunication apparatus and a radio telecommunication system in whose service area said radio telecommunication apparatus is then present in response to an input of a call placement request by the user;

receiving through said established second control channel system identification data from the radio signals broadcast by said radio telecommunication system in whose service area said radio telecommunication apparatus is present at the input of the call placement request;

comparing the system identification data received through said established second control channel with the stored system identification data; and providing an indication of roamer status if the system identification data received through said established second control channel does not coincide with the stored system identification data.

20. The method of claim 19, further comprising the step of: erasing said indication of roamer status if the system identification data subsequently received through said established second control channel coincides with the stored system identification data.

21. The method of claim 19, further comprising the step of: providing an indication of home area user status if the system identification data received through said established first control channel coincides with the stored system identification data.

22. The method of claim 19, further comprising the step of: providing an indication of home area user status if the system identification data received through said established second control channel coincides with the stored system identification data.

23. The method of claim 19, wherein the system identification data of said one radio telecommunication system is stored in a read-only memory.

24. A cellular radio telephone apparatus for use in a plurality of cellular radio systems, each having one or more base stations that broadcast radio signals throughout a service area, the radio signals including system identification data identifying the cellular radio system from which the radio signals are broadcast, said cellular radio telephone apparatus comprising:

a memory for storing system identification data of one of said cellular radio systems thereby establishing said one cellular radio system as a home cellular system;

a console unit for generating a call request signal upon entry of call request information by a user and including a power switch;

receiving circuitry, responsive to control signals applied thereto, for selectively receiving radio signals broadcast over first and second radio channels by a cellular radio system in whose service area said cellular radio telephone is then present and for detecting the system identification data from said received radio signals;

a control circuit, coupled to said memory, said console unit and said receiving circuitry, for (1) applying control signals to said receiving circuitry when said power switch is switched on, thereby enabling said receiving circuitry to receive the radio signals broadcast over said first radio channel by a cellular radio system in whose service area said cellular radio telephone is then present and to detect the system identification data from said received radio signals, (2) receiving the system identification data detected by said receiving circuitry, (3) generating a roaming status signal if the system identification data does not coincide with the stored system identification data, said roaming status signal indicating that said cellular radio telephone is not within the service area of said home cellular radio system, (4) applying control signals to said receiving circuitry in response to said call request signal thereby enabling said receiving circuitry to receive said radio signals broadcast over said second radio channel and to detect said system identification data from said received radio signals, (5) receiving the system identification data detected by said receiving circuitry, and (6) generating a roaming status signal if the received system identification data does not coincide with the stored system identification data; and a display, responsive to said roaming status signal, for displaying an indication of roaming status to the user.

25. The cellular radio telephone apparatus of claim 24, wherein:

said control circuit generates a clear display signal if, when said display is displaying an indication of roaming status, said control circuit applies control signals to said receiving circuitry in response to the call request signal and receives system identification data detected by said receiving circuitry that coincides with said stored system identification data; and said display, in response to said clear display signal, clears the display of the indication of roaming status.

* * * * *